US008198757B2

United States Patent
Brink et al.

(10) Patent No.: US 8,198,757 B2
(45) Date of Patent: Jun. 12, 2012

(54) ENERGY SAVINGS FOR A SYSTEM POWERING A LOWER VOLTAGE DEVICE FROM A HIGHER VOLTAGE POWER SOURCE, AND WHEREIN THE SYSTEM INCLUDES A POWER PLUG THAT OUTPUTS POWER TO A CONVERTER, AND A SWITCH ACTUATOR

(75) Inventors: Richard S Brink, Rochester, MN (US); Michael R Curry, Rochester, MN (US); Donald R Fearn, Rochester, MN (US); Raymond A Richetta, Rochester, MN (US); Timothy J Schmerbeck, Mantorville, MN (US); Dereje G Yilma, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 12/397,424

(22) Filed: Mar. 4, 2009

(65) Prior Publication Data

US 2010/0225297 A1 Sep. 9, 2010

(51) Int. Cl.
*H01H 35/00* (2006.01)
(52) U.S. Cl. .......... 307/119; 320/111; 320/112; 363/89; 363/146; 713/300; 713/340; 165/80.2
(58) Field of Classification Search .................. None
See application file for complete search history.

(56) References Cited

U.S. PATENT DOCUMENTS

| 4,611,289 | A | * | 9/1986 | Coppola | 713/300 |
|---|---|---|---|---|---|
| 5,019,767 | A | * | 5/1991 | Shirai et al. | 320/112 |
| 5,565,714 | A | * | 10/1996 | Cunningham | 307/112 |
| 5,886,428 | A | * | 3/1999 | Feiler et al. | 307/119 |
| 5,898,569 | A | * | 4/1999 | Bhatia | 361/700 |
| 5,907,197 | A | * | 5/1999 | Faulk | 307/119 |
| 6,003,139 | A | * | 12/1999 | McKenzie | 713/300 |
| 6,445,086 | B1 | * | 9/2002 | Houston | 307/24 |
| 6,522,032 | B1 | * | 2/2003 | Karnowka et al. | 307/119 |
| 6,573,621 | B2 | * | 6/2003 | Neumann | 307/150 |
| 6,754,092 | B2 | * | 6/2004 | McDowell et al. | 363/89 |
| 7,258,572 | B2 | * | 8/2007 | Milan | 439/502 |
| 7,315,097 | B2 | * | 1/2008 | Tajika | 307/131 |
| 7,426,126 | B1 | * | 9/2008 | Lai | 363/146 |
| 2002/0001007 | A1 | * | 1/2002 | Horigome | 347/19 |
| 2002/0171694 | A1 | * | 11/2002 | Takayanagi | 347/5 |
| 2004/0001346 | A1 | * | 1/2004 | McDowell et al. | 363/89 |
| 2004/0085030 | A1 | * | 5/2004 | Laflamme et al. | 315/291 |

(Continued)

*Primary Examiner* — Rexford N Barnie
*Assistant Examiner* — Justen Fauth
(74) *Attorney, Agent, or Firm* — James R. Nock

(57) ABSTRACT

The present invention provides a power saving method and apparatus for powering a lower voltage device from a higher voltage power source. The apparatus includes a switch having an input coupled to an output of the higher voltage power source. The apparatus further includes a high-to-low voltage converter having an input coupled to an output of the switch. The apparatus also includes a power plug having an input coupled to an output of the high-to-low voltage power converter, and an output configured to receive a power socket of the low voltage device. Finally, the apparatus includes a switch actuator coupled to the power plug and the switch. When the power plug is operatively engaged within the power socket of the lower voltage device, the switch actuator closes the switch. When the power plug is operatively disengaged from the power plug, the switch actuator opens the switch.

6 Claims, 3 Drawing Sheets

U.S. PATENT DOCUMENTS

| | | | |
|---|---|---|---|
| 2006/0087872 A1* | 4/2006 | Barsun et al. | 363/146 |
| 2006/0267411 A1* | 11/2006 | Farmer | 307/66 |
| 2007/0047270 A1* | 3/2007 | Makino et al. | 363/34 |
| 2007/0155191 A1* | 7/2007 | Buller et al. | 439/8 |
| 2007/0216353 A1* | 9/2007 | Fischer et al. | 320/115 |
| 2007/0220286 A1* | 9/2007 | Benton et al. | 713/300 |
| 2007/0300089 A1* | 12/2007 | Bhogal et al. | 713/320 |
| 2008/0130340 A1* | 6/2008 | Unger et al. | 363/146 |

* cited by examiner

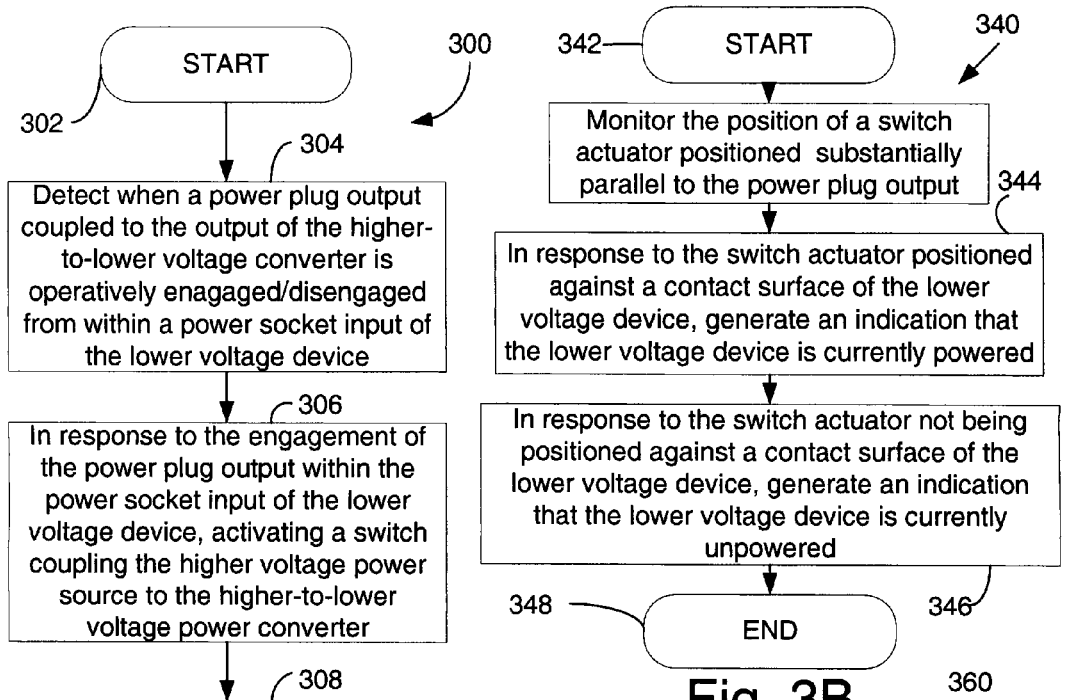
Fig. 3A
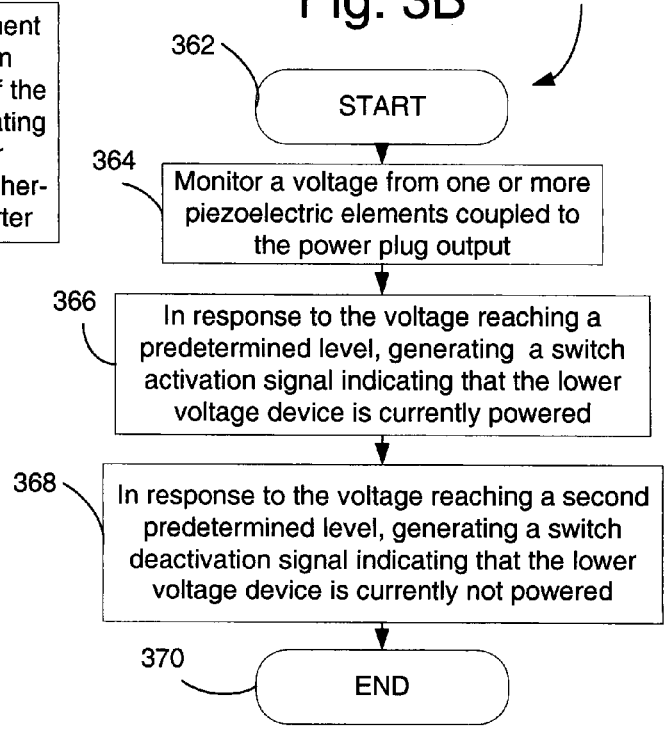
Fig. 3B
Fig. 3C

ENERGY SAVINGS FOR A SYSTEM POWERING A LOWER VOLTAGE DEVICE FROM A HIGHER VOLTAGE POWER SOURCE, AND WHEREIN THE SYSTEM INCLUDES A POWER PLUG THAT OUTPUTS POWER TO A CONVERTER, AND A SWITCH ACTUATOR

FIELD OF THE INVENTION

This invention relates generally to an energy saving method and apparatus for electrical devices, and more particularly, to an energy saving method and apparatus when powering a lower voltage electrical device from a higher voltage power source.

BACKGROUND OF THE INVENTION

Electrical power cords are used on almost all electrical devices and appliances. An input or receptacle end of the cord generally plugs into a wall outlet and receives the line power (usually 110-240v AC and 50-60 Hz). An output end of the power cord then connects to the electrical device or appliance desired to be powered.

A large number of electrical devices, including most consumer electronics, require a high-to-low voltage power converter positioned somewhere in the power path between the line power wall outlet and the electrical device itself. This is done for safety and cost reasons, and results in a much safer, lower voltage (typically 5-12 V DC) being delivered to the electrical device under power. As a result, the electrical device/appliance need only meet much less stringent safety approvals.

Unfortunately, the primary side of the power converter in such a configuration is always drawing standby power when plugged into the wall outlet, even if an electrical device/appliance is not plugged into the output end of the power cord which is on the power converter's secondary side. Also, since the high-to-low voltage power converter constantly receives power, whether or not the electrical device is plugged in, the lifetime of the power converter can be significantly shortened.

SUMMARY OF THE INVENTION

In accordance with one aspect of the invention, the present invention provides a power saving apparatus for powering a lower voltage device from a higher voltage power source. The apparatus includes a switch coupled to the higher voltage power source. The apparatus further includes a high-to-low voltage converter coupled to the switch, the high-to-low voltage converter also coupled to the higher voltage power source. The apparatus also includes a power plug coupled to the high-to-low voltage power converter. The power plug is also coupled to a power socket of the lower voltage device. Finally, the apparatus includes a switch actuator coupled to the power plug and the switch. When the power plug is operatively engaged within the power socket of the lower voltage device, the switch actuator closes the switch. When the power plug is operatively disengaged from the power plug, the switch actuator opens the switch.

In one embodiment of the present invention, the switch actuator is a mechanical switch located within the power plug. In an embodiment, the switch actuator is positioned substantially parallel to the power plug output, such that the act of operatively engaging the power plug within the power socket of the lower voltage device also operatively engages the switch actuator against a contact surface of the lower voltage device. In an embodiment, the switch actuator is positioned substantially parallel to the power plug output, such that the act of operatively disengaging the power plug from within the power socket of the lower voltage device also operatively disengages the switch actuator from against a contact surface of the lower voltage device.

In accordance with one embodiment, the switch is located within the power plug. In one embodiment, the switch actuator comprises at least one piezoelectric element disposed on an engaging surface of the power plug output, such that the act of operatively engaging the power plug output within the power socket of the lower voltage device generates a signal used to drive the switch, and the act of operatively disengaging the power plug out from within the power socket of the lower voltage device generates a signal used to drive the switch.

In another embodiment consistent with the invention, a method is provided for power saving when powering a lower voltage device from a higher voltage power source via a higher-to-lower voltage power converter. The method begins by detecting when a power plug output coupled to the output of the higher-to-lower voltage power converter is operatively engaged and disengaged from within a power socket input of the lower voltage device. Next, in response to the engagement of the power plug output within the power socket input of the lower voltage device, activating a switch coupling the higher voltage power source to the higher-to-lower voltage power converter such that current flows from the higher voltage power source to the higher-to-lower voltage power converter. Finally, in response to the disengagement of the power plug output from within the power socket input of the lower voltage device, deactivating a switch coupling the higher voltage power source to the higher-to-lower voltage power converter such that current does not flow from the higher voltage power source to the higher-to-lower voltage power converter.

In a further embodiment consistent with the invention, the step of detecting when a power plug output coupled to the output of the higher-to-lower voltage power converter is operatively engaged and disengaged from within a power socket input of the lower voltage device further includes the steps of: 1) monitoring the position of a switch actuator positioned substantially parallel to the power plug output; 2) in response to the switch actuator positioned against a contact surface of the lower voltage device, generating an indication that the lower voltage device is currently powered; and 3) in response to the switch actuator not being positioned against the contact surface of the lower voltage device, generating an indication that the lower voltage device is currently unpowered.

In another embodiment consistent with the invention, the step of detecting when a power plug coupled to the output of the higher-to-lower voltage power converter is operatively engaged and disengaged from within a power socket of the lower voltage device further includes the steps of: 1) monitoring a voltage from one or more piezoelectric elements coupled to the power plug output; 2) in response to the voltage reaching a first predetermined level, generating a switch activation signal indicating that the lower voltage device is currently powered; and 3) in response to the voltage reaching a second predetermined level, generating a switch deactivation signal indicating that the lower voltage device is currently unpowered.

These and other advantages and features that characterize the invention are set forth in the claims annexed hereto and forming a further part hereof. However, for a better understanding of the invention, and of the advantages and objectives attained through its use, reference should be made to the drawings, and to the accompanying descriptive matter, in which there are described exemplary embodiments of the invention.

BRIEF DESCRIPTION OF THE DRAWINGS

FIG. 3A is a flow diagram describing a method for power saving when powering a lower voltage device from a higher voltage power source via a higher-to-lower voltage power converter.

FIG. 3B is a flow diagram describing in further detail, in a first embodiment, the step of detecting when a power plug output is operatively engaged and disengaged from within a power socket input of the lower voltage device shown in FIG. 3A.

FIG. 3C is a flow diagram describing in further detail, in a second embodiment, the step of detecting when a power plug output is operatively engaged and disengaged from within a power socket input of the lower voltage device shown in FIG. 3A.

DETAILED DESCRIPTION

In the following detailed description of embodiments of the invention, reference is made to the accompanying drawings, which form a part hereof, and within which are shown by way of illustration specific embodiments by which the invention may be practiced. It is to be understood that other embodiments may be utilized and changes may be made without departing from the scope of the invention.

Figure 1:
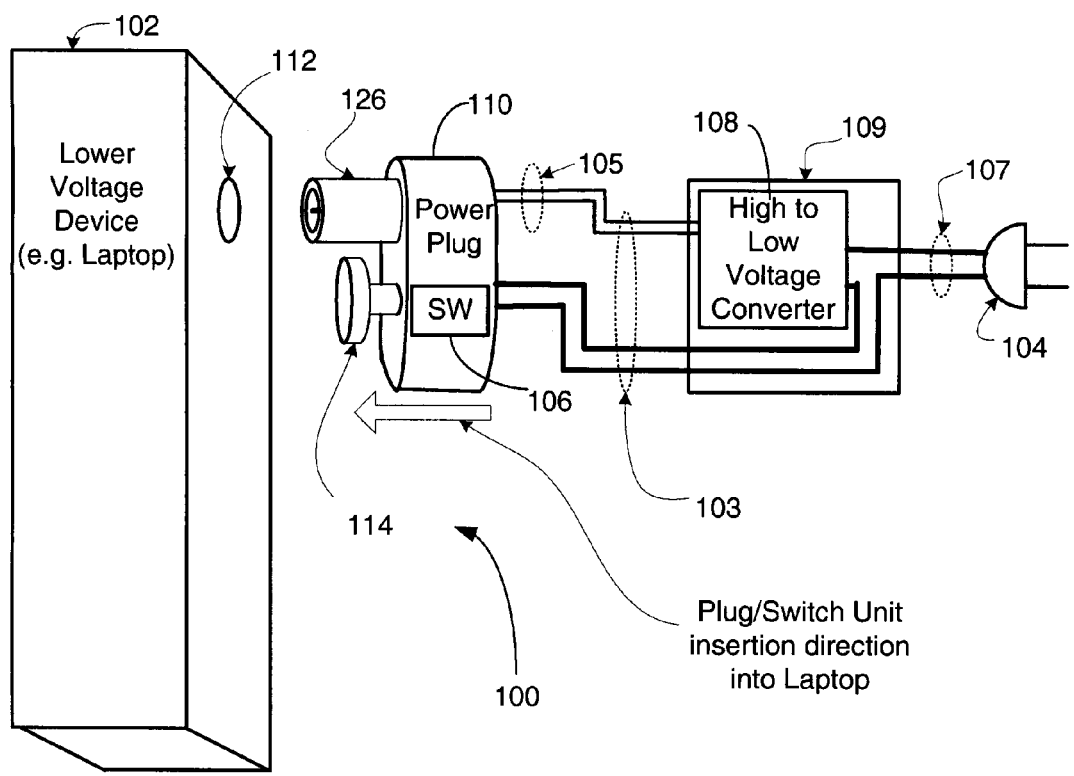
FIG. 1 illustrates a power saving apparatus for powering a lower voltage device from a higher voltage power source, wherein the switch actuator is a mechanical switch.

FIG. 1 illustrates one embodiment of the power saving apparatus of the present invention, shown generally at 100. The power saving apparatus 100 includes a lower voltage device 102 (e.g., a laptop computer) which is powered by a higher voltage power source 104 (e.g., a standard alternating current (AC) wall outlet). In one embodiment of the present invention, the higher voltage power source 104 is an alternating current power source having a voltage of between approximately 110V and approximately 240V AC. In one embodiment of the present invention, the lower voltage device 102 is a direct current powered device having an operating voltage of between approximately 3V and approximately 20V DC.

The power saving apparatus 100 further includes a switch 106 having an input connected to the output of the higher voltage power source 104. In the illustrated embodiment, switch 106 resides within a power plug 110. The power saving apparatus 100 further includes a high-to-low voltage power converter 108 incorporated within a power "brick" 109, the high-to-low voltage power converter coupled to the switch 106, and also to the higher voltage power source 104. The high-to-low voltage power converter 108 converts the AC wall outlet voltage 107 to a lower DC voltage 105 used by many lower voltage devices 102, such as laptop computers. The power saving apparatus 100 also includes a power plug 110 coupled to the high-to-low voltage power converter 108. The power plug includes and a power plug barrel 126 configured to connect into a power socket 112 of the lower voltage device 102. A connector cable 103 includes a first line carrying the higher voltage AC current to the switch 106, a second line carrying the higher voltage AC current back from the switch 106 to the high-to-low voltage converter 108, and a third and a fourth line carrying the lower voltage DC current between the high-to-low voltage converter 108 and the power plug 110. Cable 103 is designed to shield the first, second and third lines from electromagnetic interference (EMI) issues. Cable 103 is also configured to comply with applicable standards, such as those from Underwriters Laboratories (UL). The power saving apparatus further includes a spring loaded switch actuator 114 coupled to the power plug 110 and the switch 106. When the power plug 110 is operatively engaged within the power socket 112 of the lower voltage device 102, the spring loaded switch actuator 114 is correspondingly pushed toward the body of the power plug 110, causing the switch 106 to close. Once switch 106 is closed, current is allowed to flow from the higher voltage power source 104 to the high-to-low voltage converter 108, which then provides suitable low voltage via lower DC voltage 106 to lower voltage device 102. When the power plug 110 is operatively disengaged from within the power socket 112 of the lower voltage device 102, the spring loaded switch actuator 114 correspondingly moves away from the body of the power plug 110, and switch 106 is opened. Once switch 106 is opened, no current is allowed to flow from the higher voltage power source 104 to the high-to-low voltage power converter 108.

By introducing a switch 106 in the path between the higher voltage power source 104 and the high-to-low voltage power converter 108, no current will flow from the higher voltage power source 104 to the high-to-low voltage power converter 108 if the lower voltage device 102 is not currently plugged into power plug 110. In conventional arrangements, a low trickle current flows from the higher voltage power source 104 to the high-to-low voltage power converter 108 regardless of whether then lower voltage device 102 is plugged into power plug 110 or not. Thus, the present invention provides a power savings advantage over conventional arrangements when the lower voltage device 102 is not plugged into power plug 110.

Figure 2A:
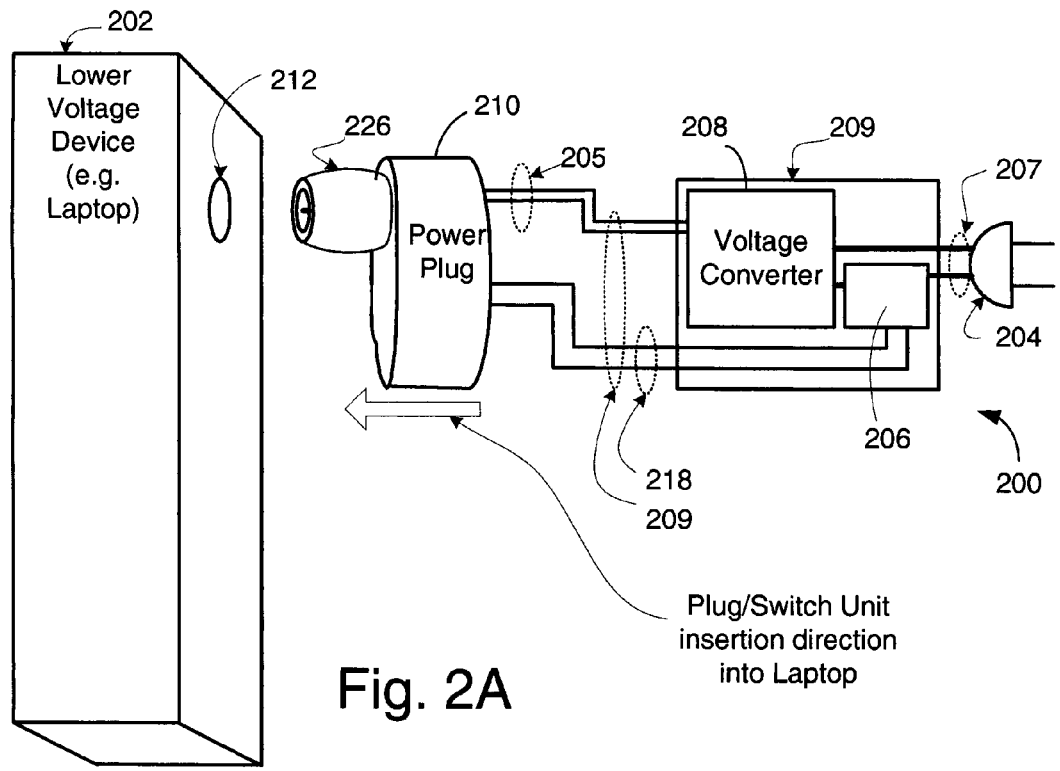
FIG. 2A illustrates an alternative embodiment of a power saving apparatus for powering a lower voltage device from a higher voltage device, wherein the switch actuator is a piezoelectric element.

FIG. 2A illustrates another embodiment of the power saving apparatus of the present invention, shown generally at 200. The power saving apparatus 200 includes a lower voltage device 202 (e.g., a laptop computer) which is powered by a higher voltage power source 204 (e.g., a standard alternating current (AC) wall outlet). In one embodiment of the present invention, the higher voltage power source 204 is an alternating current power source having a voltage of between approximately 110V and approximately 240V AC. In one embodiment of the present invention, the lower voltage device 202 is a direct current powered device having an operating voltage of between approximately 3V and approximately 20V DC.

Figure 2B:
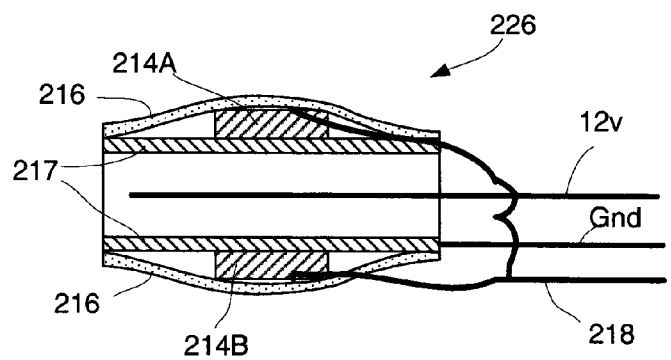
FIG. 2B illustrates the piezoelectric element of FIG. 2A in more detail.

The power saving apparatus 200 further includes a switch 206 having an input connected to the output of the higher voltage power source 204. The power saving apparatus 200 further includes a high-to-low voltage power converter 208 incorporated within a power "brick" 209. The high-to-low voltage power converter 208 is coupled to the switch 206, and also to the higher voltage power source 204. In this embodiment, the switch 206 resides within the power "brick" 209 rather than within the lower voltage device power plug 210. As a result, the higher voltage AC line current need not run in the same cable 203 as the lower voltage DC current as shown previously in FIG. 1. The high-to-low voltage power converter 208 converts the AC wall outlet voltage 207 to a lower DC voltage 205 used by lower voltage electronic devices 202, such as laptop computers. The power saving apparatus 200 also includes a power plug 210 coupled to the high-to-low voltage power converter 208, and also coupled to a power socket 212 of the lower voltage device 202. The power saving apparatus further includes a spring loaded switch actuator 214 (e.g. a spring assembly 216 and two piezoelectric elements 214A and 214B) positioned on the engaging surface of the barrel of the power plug 210, as shown in FIG. 2B. Two piezoelectric signal wires 218A and 218B couple the piezoelectric elements 214A and 214B to switch 206.

When the power plug 210 is operatively engaged within the power socket 212 of the lower voltage device 202, the spring assembly 216 of switch actuator 214 is correspondingly compressed toward the barrel 226 of the power plug 210, an electrical signal is generated at piezoelectric elements 214A and 214B, and transmitted via piezoelectric signal wire 218 to the switch, causing the switch 206 to close. Once switch 206 is closed, current is allowed to flow from the higher voltage power source 204 to the high-to-low voltage converter 208. When the power plug barrel 226 is operatively disengaged from within the power socket 212 of the lower voltage device 202, spring assembly 216 of switch actuator 214 correspondingly moves away from the barrel core 217 of the power plug barrel 226 thus decompressing piezoelectric elements 214A and 214B, an electrical signal is generated at piezoelectric elements 214A and 214B, and transmitted via piezoelectric signal wire 218, causing switch 206 back at the power transformer "brick" 209 to open. Once switch 206 is opened, no current is allowed to flow from the higher voltage power source 204 to the high-to-low voltage power converter 208.

FIG. 3A is a flow diagram describing a method for power saving when powering a lower voltage device from a higher voltage power source via a higher-to-lower voltage power converter, shown generally at 300. The method begins at block 302. At block 304, the method detects when a power plug output coupled to the output of the higher-to-lower voltage converter is operatively engaged and disengaged from within a power socket input of the lower voltage device. At block 306, in response to the engagement of the power plug output within the power socket input of the lower powered device, a switch coupling the higher voltage power source to the higher-to-lower voltage power converter is activated such that current flows from the higher voltage power source to the higher-to-lower voltage power converter. Finally, at block 308, in response to the disengagement of the power plug output from within the power socket input of the lower powered device, a switch coupling the higher voltage power source to the higher-to-lower voltage power converter is deactivated such that current does not flow from the higher voltage power source to the higher-to-lower voltage power converter. The method ends at block 310.

FIG. 3B is a flow diagram 340 describing in further detail, in a first embodiment, the step of detecting when a power plug output is operatively engaged and disengaged from within a power socket input of the lower voltage device shown in FIG. 3A, block 304. The flow diagram starts at block 341. At block 342, the position of a switch actuator positioned substantially parallel to the power plug output is monitored. Next, at block 344, in response to the switch actuator positioned against a contact surface of the lower voltage device, an indication is generated that the lower voltage device is currently powered. Finally, at block 346, in response to the switch actuator not being positioned against the contact surface of the lower voltage device, an indication is generated that the lower voltage device is currently unpowered. At block 348, the flow ends.

FIG. 3C is a flow diagram describing in further detail, in a second embodiment, the step of detecting when a power plug output is operatively engaged and disengaged from within a power socket input of the lower voltage device shown in FIG. 3A, block 304. The flow diagram starts at block 362. At block 364, a voltage from one or more piezoelectric elements coupled to the power plug output is monitored. At block 366, in response to the voltage reaching a first predetermined level, a switch activation signal indicating that the lower voltage device is currently powered is generated. At block 368, in response to the voltage reaching a second predetermined level, a switch deactivation signal is generated indicating that the lower voltage device is currently unpowered. At block 370, the flow ends.

While the present invention has been illustrated by a description of various embodiments and while these embodiments have been described in considerable detail, it is not the intention of the Applicants to restrict, or in any way limit, the scope of the appended claims to such detail. The invention in its broader aspects is therefore not limited to the specific details, representative apparatus and method, and illustrative example shown and described. Accordingly, departures may be made from such details without departing from the spirit or scope of Applicants' general inventive concept. Having thus described the invention, the same will become better understood from the appended claims in which it is set forth in a nonlimiting manner.

What is claimed is:

1. A power saving apparatus for powering a lower voltage direct current (DC) device from a higher voltage alternating current (AC) power source, the apparatus comprising:
   a switch having an input electrically coupled to a first output of the higher voltage power source, the switch also having an output electrically coupled to a first input of an AC-to-DC high-to-low voltage power converter, the AC-to-DC high-to-low voltage power converter also having a second input electrically coupled to a second output of the higher voltage AC power source;
   a power plug having an input electrically coupled to an output of the AC-to-DC high-to-low voltage power converter, the power plug capable of operatively engaging a power socket of the lower voltage DC device; and
   a switch actuator coupled to the power plug and the switch, wherein the switch actuator is a mechanical switch located within the power plug;
   wherein operatively engaging the power plug within the power socket of the lower voltage DC device causes the switch actuator to close the switch thus allowing current to flow from the higher voltage AC power source to the AC-to-DC high-to-low voltage power converter, and operatively disengaging the power plug from within the socket of the lower voltage DC device causes the switch actuator to open the switch thus disabling current from flowing from the higher voltage AC power source to the AC-to-DC high-to-low voltage power converter, and wherein the switch actuator is positioned substantially parallel to the power plug output, such that the act of operatively engaging the power plug within the power socket of the lower voltage DC device also operatively engages the switch actuator against a contact surface of the lower voltage DC device via a spring loading mechanism.

2. A power saving apparatus for powering a lower voltage direct current (DC) device from a higher voltage alternating current (AC) power source, the apparatus comprising:
   a switch having an input electrically coupled to a first output of the higher voltage power source, the switch also having an output electrically coupled to a first input of an AC-to-DC high-to-low voltage power converter, the AC-to-DC high-to-low voltage power converter also having a second input electrically coupled to a second output of the higher voltage AC power source;

a power plug having an input electrically coupled to an output of the AC-to-DC high-to-low voltage power converter, the power plug capable of operatively engaging a power socket of the lower voltage DC device; and a switch actuator coupled to the power plug and the switch, wherein the switch actuator is a mechanical switch located within the power plug;

wherein operatively engaging the power plug within the power socket of the lower voltage DC device causes the switch actuator to close the switch thus allowing current to flow from the higher voltage AC power source to the AC-to-DC high-to-low voltage power converter, and operatively disengaging the power plug from within the socket of the lower voltage DC device causes the switch actuator to open the switch thus disabling current from flowing from the higher voltage AC power source to the AC-to-DC high-to-low voltage power converter, wherein the switch actuator is positioned substantially parallel to the power plug output, such that the act of operatively disengaging the power plug from within the power socket of the lower voltage DC device also operatively disengages the switch actuator from against a contact surface of the lower voltage DC device via a spring loading mechanism.

3. A power saving apparatus for powering a lower voltage direct current (DC) device from a higher voltage alternating current (AC) power source, the apparatus comprising:

a switch having an input electrically coupled to a first output of the higher voltage power source, the switch also having an output electrically coupled to a first input of an AC-to-DC high-to-low voltage power converter, the AC-to-DC high-to-low voltage power converter also having a second input electrically coupled to a second output of the higher voltage AC power source;

a power plug having an input electrically coupled to an output of the AC-to-DC high-to-low voltage power converter, the power plug capable of operatively engaging a power socket of the lower voltage DC device; and a switch actuator coupled to the power plug and the switch, wherein the switch actuator is a mechanical switch located within the power plug;

wherein operatively engaging the power plug within the power socket of the lower voltage DC device causes the switch actuator to close the switch thus allowing current to flow from the higher voltage AC power source to the AC-to-DC high-to-low voltage power converter, and operatively disengaging the power plug from within the socket of the lower voltage DC device causes the switch actuator to open the switch thus disabling current from flowing from the higher voltage AC power source to the AC-to-DC high-to-low voltage power converter, wherein the switch actuator comprises at least one piezoelectric element disposed on an engaging surface of the power plug output, such that the act of operatively engaging the power plug output within the power socket of the lower voltage DC device generates a signal used to drive the switch.

4. A power saving apparatus for powering a lower voltage direct current (DC) device from a higher voltage alternating current (AC) power source, the apparatus comprising:

a switch having an input electrically coupled to a first output of the higher voltage power source, the switch also having an output electrically coupled to a first input of an AC-to-DC high-to-low voltage power converter, the AC-to-DC high-to-low voltage power converter also having a second input electrically coupled to a second output of the higher voltage AC power source;

a power plug having an input electrically coupled to an output of the AC-to-DC high-to-low voltage power converter, the power plug capable of operatively engaging a power socket of the lower voltage DC device; and a switch actuator coupled to the power plug and the switch, wherein the switch actuator is a mechanical switch located within the power plug;

wherein operatively engaging the power plug within the power socket of the lower voltage DC device causes the switch actuator to close the switch thus allowing current to flow from the higher voltage AC power source to the AC-to-DC high-to-low voltage power converter, and operatively disengaging the power plug from within the socket of the lower voltage DC device causes the switch actuator to open the switch thus disabling current from flowing from the higher voltage AC power source to the AC-to-DC high-to-low voltage power converter, wherein the switch actuator comprises at least one piezoelectric element disposed on an engaging surface of the power plug output, such that the act of operatively disengaging the power plug output from within the power socket of the lower voltage DC device generates a signal used to drive the switch.

5. A method for power saving when powering a lower voltage direct current (DC) device from a higher voltage alternating current (AC) power source via a AC-to-DC higher-to-lower voltage power converter, the method comprising:

detecting when a power plug output coupled to the output of the AC-to-DC higher-to-lower voltage power converter is operatively engaged and disengaged from within a power socket input of the lower voltage DC device, further comprising:

monitoring the position of a switch actuator positioned substantially parallel to the power plug output;

in response to the switch actuator positioned against a contact surface of the lower voltage DC device, generating an indication that the lower voltage DC device is currently powered; and in response to the switch actuator not being positioned against the contact surface of the lower voltage DC device, generating an indication that the lower voltage DC device is currently unpowered;

in response to the engagement of the power plug output within the power socket input of the lower voltage DC device, activating a switch coupling the higher voltage AC power source to the AC-to-DC higher-to-lower voltage power converter such that current flows from the higher voltage AC power source to the AC-to-DC higher-to-lower voltage power converter;

in response to the disengagement of the power plug output from within the power socket input of the lower voltage DC device, deactivating a switch coupling the higher voltage AC power source to the AC-to-DC higher-to-lower voltage power converter such that current does not flow from the higher voltage AC power source to the AC-to-DC higher-to-lower voltage power converter.

6. A method for power saving when powering a lower voltage direct current (DC) device from a higher voltage alternating current (AC) power source via a AC-to-DC higher-to-lower voltage power converter, the method comprising:

detecting when a power plug output coupled to the output of the AC-to-DC higher-to-lower voltage power converter is operatively engaged and disengaged from within a power socket input of the lower voltage DC device, further comprising:
  monitoring a voltage from one or more piezoelectric elements coupled to the power plug output;
  in response to the voltage reaching a first predetermined level, generating a switch activation signal indicating that the lower voltage DC device is currently powered; and
  in response to the voltage reaching a second predetermined level, generating a switch deactivation signal indicating that the lower voltage DC device is currently unpowered;
  in response to the engagement of the power plug output within the power socket input of the lower voltage DC device, activating a switch coupling the higher voltage AC power source to the AC-to-DC higher-to-lower voltage power converter such that current flows from the higher voltage AC power source to the AC-to-DC higher-to-lower voltage power converter;
  in response to the disengagement of the power plug output from within the power socket input of the lower voltage DC device, deactivating a switch coupling the higher voltage AC power source to the AC-to-DC higher-to-lower voltage power converter such that current does not flow from the higher voltage AC power source to the AC-to-DC higher-to-lower voltage power converter.

* * * * *